(12) United States Patent  (10) Patent No.: US 6,504,567 B1
Pagan  (45) Date of Patent: Jan. 7, 2003

(54) PHOTOPLOTTING PROCESS AND APPARATUS FOR HIGH-ENERGY PLOTTING OF A COMPUTER-STORED RASTER IMAGE ON A PHOTOSENSITIVE RECORD CARRIER

(75) Inventor: Robin Pagan, Stuttgart (DE)

(73) Assignee: Mivatec Hard-und Software GmbH, Schönaich (DE)

( * ) Notice: Subject to any disclaimer, the term of this patent is extended or adjusted under 35 U.S.C. 154(b) by 0 days.

(21) Appl. No.: 09/351,174

(22) Filed: Jul. 12, 1999

(30) Foreign Application Priority Data

Jul. 10, 1998 (DE) .......................... 198 30 896

(51) Int. Cl.$^7$ ................................. B41J 2/47
(52) U.S. Cl. .............................. 347/255; 347/239
(58) Field of Search ................... 347/239, 241, 347/255, 256, 248; 359/214, 245, 280; 348/764, 770, 771, 755, 766, 751, 767

(56) References Cited

U.S. PATENT DOCUMENTS

| 4,087,173 A | | 5/1978 | Beery ..................... 355/24 |
| 4,374,618 A | | 2/1983 | Howard .................. 355/50 |
| 5,012,259 A | * | 4/1991 | Hattori et al. ............ 347/232 |
| 5,049,901 A | | 9/1991 | Gelbart .................. 347/239 |
| 5,325,116 A | * | 6/1994 | Sampsell ................ 347/255 |
| 5,331,338 A | * | 7/1994 | Mager .................... 347/248 |
| 5,754,217 A | | 5/1998 | Allen ..................... 347/239 |
| 5,815,303 A | * | 9/1998 | Berlin .................... 359/214 |

FOREIGN PATENT DOCUMENTS

EP 0739125 10/1996

OTHER PUBLICATIONS

"MIVATEC Xenon Plotter," Information Sheet, MIVATEC Hard–und Software GmbH (Oct. 1996).
"MIVATEC Xenon Plotter," Information Sheet, MIVATEC Hard–und Software GmbH (Oct. 1997).

* cited by examiner

*Primary Examiner*—Hai Pham
(74) *Attorney, Agent, or Firm*—Greenblum & Bernstein, P.L.C.

(57) ABSTRACT

Process and apparatus for a plotting raster image on a light-sensitive carrier. The process includes continuously displacing an exposure head, having a light modulator, relative to the light-sensitive record carrier, positioning a lens between the exposure head and the light-sensitive record carrier, and displacing the lens relative to the exposure head and light-sensitive record carrier. The apparatus includes an exposure head having a light modulator, a light-sensitive record carrier, and a plotting drive unit coupled to at least one of the exposure head and the light-sensitive record carrier. In this manner, the exposure head and the light-sensitive record carrier are adapted for relative movement to each other. The apparatus also includes a lens positioned between the exposure head and the light-sensitive record carrier, and a lens drive unit coupled to the lens. In this manner, the lens is adapted for movement relative to the exposure head and light-sensitive record carrier.

28 Claims, 5 Drawing Sheets

PHOTOPLOTTING PROCESS AND APPARATUS FOR HIGH-ENERGY PLOTTING OF A COMPUTER-STORED RASTER IMAGE ON A PHOTOSENSITIVE RECORD CARRIER

CROSS-REFERENCE TO RELATED APPLICATIONS

The present application claims priority under 35 U.S.C. §119 of German Patent Application No. 198 30 896.5, filed on Jul. 10, 1998, the disclosure of which is expressly incorporated by reference herein in its entirety.

BACKGROUND OF THE INVENTION

1. Field of the Invention

The present invention relates to a photoplotting process for high energy plotting of a computer-stored raster image on a photosensitive record carrier.

2. Discussion of Background Information

Photoplotting processes and arrangements serve, for example, to produce photographic artwork for printed circuit boards.

Photoplotters plotting a computer-stored raster image on a plane, photosensitive record carrier are known from the prior art (information sheet Xenon Plotter by the company MIVATEC Hard- und Software GmbH, Benzstrasse, 17, D71171 Schönaich, of 15.10.1996).

During said plotting, a so-called exposure head (with a plotting area of about 5×7.5 mm) is guided over a record carrier, which has a large area (up to approximately 720×600 mm) in relation thereto, for the purpose of plotting picture elements composing the raster image of the record carrier.

The exposure head is provided with an LCD matrix of light-modulation elements (LCD: liquid crystal device), each of which can be selectively controlled by electrical means in order to open or block it for transmitted light.

If transmitted light is projected onto this LCD matrix, it can only pass as a 'light beam' through the matrix at those elements that are controlled to admit the passage of light.

Each of the light beams admitted forms a corresponding picture element on the photosensitive record carrier. Missing light beams-equivalent to blocked elements-form 'missing picture elements'.

The raster image of the record carrier consists of a multiplicity of picture elements, including plotted and non-plotted (missing) picture elements.

In the above arrangement light from a Xenon flash lamp is projected onto the LCD matrix.

Since the exposure head containing the LCD matrix has a much smaller area (comparable to the square of a chessboard) than the record carrier (comparable to a chessboard having many squares), said exposure head must be guided successively to all the positions of the chessboard squares so that the picture elements can be plotted there.

In view of the desired high resolution (in the range of>10 micrometers) of the raster image of the record carrier, the movement of the exposure head imposes the highest tolerance requirements with respect to the precision of the movement mechanism for displacement of the head.

Because the exposure head is moved continuously over the record carrier, there is only a very short moment to illuminate the head (by means of a Xenon flash lamp) aligned at a 'chessboard field' of the record carrier. A longer exposure period would lead to blurred picture elements (with 'comet trails') through sustained movement of the head, effectively influencing the resolution of the plotting disadvantageously.

Short exposure periods are, however, associated with minimal plotting energy, which again signifies that only photographic artwork, such as for subsequent circuit board manufacture, can be prepared. Such a comparatively small quantity of plotting energy obviates direct exposure of so-called circuit board photo-resist material.

SUMMARY OF THE INVENTION

The present invention relates to a process having a comparatively higher plotting energy, which also makes use of an exposure head being moved continuously. The plotting energy should be sufficiently high to enable direct exposure of photo-resist material.

A further object of the present invention is to propose a photoplotting process which permits plotting a raster image of the record carrier with variable image scale.

In accordance with the present invention, during relative displacement between the light modulator and the record carrier, the excursion of the light beams emanating from the light modulator and impacting a sub-area of the record carrier raster image are compensated during a time interval T by a displacable lens disposed between the light modulator and record carrier. Time interval T is above a value W1, which relates to the permissible maximum displacement path of the relative movement for the resolution of plotting without use of the lens, and is below a value W2, which relates to a time interval that begins in a current sub-area of the record carrier raster image during the projecting entry of the first half of the light modulator surface and that ends only when the second half of the light modulator surface projects into this sub-area of the record carrier raster image, reduced by the reverse period for the lens. The lens, after recording the picture elements in a record carrier raster image sub-area is displaced in a direction opposite to the compensation direction into a starting position for plotting of the next sub-area of the record carrier raster image.

Accordingly, the instant invention relates to a process for plotting of a raster image on a light-sensitive record carrier. The process includes converting a computer-stored raster image comprising raster points into controllable raster point-related light beams via a light modulator, such that picture elements corresponding to the raster points are plotted on a record carrier, matrix-like dividing of the computer raster image into imaginary computer raster image sub-areas, and matrix-like dividing of the record carrier raster image is into imaginary record carrier raster image sub-areas, wherein the sub-areas of the computer and record carrier raster image are associated with one another. The process further includes matrix-like dividing of the imaginary computer raster image sub-areas into imaginary raster point positions, matrix-like dividing of the imaginary computer raster image sub-areas into n imaginary raster point positions, and matrix-like dividing of the sub-areas of the record carrier raster image into n imaginary picture element positions. Further, the process includes assigning the picture element positions to the raster image positions, simultaneously plotting the picture elements corresponding to the raster points of a sub-area of a record carrier raster image, successively plotting the sub-areas of the record carrier raster image, continuously moving a light modulator relative to the record carrier to capture an entire surface of the record carrier according to the sub-areas of the record carrier raster image, and projecting the light modulator for each sub-area of the record carrier raster image with light. During relative displacement between the light modulator and the record carrier, an excursion of the light beams emanating from the light modulator and impacting a sub-area of the record carrier raster image are compensated during a time interval T by a displaceable lens disposed between the light modulator and record carrier. The time interval T is selected to be above a value W1, which relates to a maximum permissible displacement path for the relative movement for plotting resolution without use of the displaceable lens, and to be below a value W2, which relates to a time interval that begins when a first half of the light modulator surface projects into a specified sub-area of the record carrier raster image and that ends when only a second half of the light modulator surface projects into the specified sub-area of the record carrier raster image, and is reduced by a reverse period for the displaceable lens. The displaceable lens, after recording the picture elements in a record carrier raster image sub-area, is displaced in a direction opposite to the compensation direction into a starting position for plotting of the next sub-area of the record carrier raster image.

In accordance with a feature of the present invention, the light modulator can include a tilting mirror element semiconductor chip.

According to another feature of the present invention, the light modulator can include a liquid crystal arrangement.

According to still another feature of the instant invention, the light modulator may include one of a magneto-optical and ferro-optical electrical arrangement.

In accordance with a further feature of the present invention, the light source may be adapted to emit sustained light. Further, the light source may include a mercury arc lamp.

In accordance with another feature of the present invention, the record carrier material can be in a liquid state prior to plotting.

In accordance with a still further feature of the instant invention, the displaceable lens may include a multiple element lens that determines a focussing scale.

The present invention also relates to a process for a plotting raster image on a light-sensitive carrier. The process includes continuously displacing an exposure head, comprising a light modulator, relative to the light-sensitive record carrier, positioning a lens between the exposure head and the light-sensitive record carrier, and displacing the lens relative to the exposure head and light-sensitive record carrier.

In accordance with a feature of the invention, the process can further include directing a sustained light beam onto the exposure head.

According to another feature of the instant invention, the process may further include directing a sustained light beam from a mercury arc lamp onto the exposure head.

According to still another feature of the present invention, the displacing of the lens relative to the exposure head and the light-sensitive record carrier compensates for blurring.

In accordance with a further feature of the invention, the process further includes logically subdividing the light-sensitive record carrier into a matrix-like arrangement, wherein each entry of the matrix-like arrangement corresponds to a portion of the raster image to be plotted.

According to still another feature of the instant invention, the process can further include, during plotting, adjusting the exposure head so that light, through the lens, is incident upon the light-sensitive record carrier; after plotting, adjusting the exposure head so that light is not incident upon the light-sensitive carrier, and returning the lens to a starting position.

In accordance with a further feature of the invention, a drive unit can be coupled to the light-sensitive record carrier and the exposure head is fixedly positioned.

In accordance with a still further feature of the present invention, a drive unit can be coupled to the exposure head and the light-sensitive record carrier is fixedly positioned.

According to still another feature of the present invention, during plotting, the lens is displaced in a direction opposite a direction of the relative movement of the exposure head, and, after plotting, the lens is displaced in a same direction as the direction of relative movement of the exposure head.

The instant invention relates to an apparatus for plotting a raster image. The apparatus includes an exposure head comprising a light modulator, a light-sensitive record carrier, and a plotting drive unit coupled to at least one of the exposure head and the light-sensitive record carrier. In this manner, the exposure head and the light-sensitive record carrier are adapted for relative movement to each other. The apparatus also includes a lens positioned between the exposure head and the light-sensitive record carrier, and a lens drive unit coupled to the lens. In this manner, the lens is adapted for movement relative to the exposure head and light-sensitive record carrier.

In accordance with yet another feature of the instant invention, a light source may be adapted to emitting a sustained light beam. The light source may include a mercury arc lamp.

The present invention relates to an apparatus for plotting of a raster image on a light-sensitive record carrier. The apparatus includes a light modulator adapted to convert a computer-stored raster image comprising raster points into controllable raster point-related light beams. Picture elements corresponding to the raster points are plotable on a record carrier. A logic device is provided that matrix-like divides the computer raster image into imaginary computer raster image sub-areas, that matrix-like divides the record carrier raster image is into imaginary record carrier raster image sub-areas, wherein the sub-areas of the computer and record carrier raster image are associated with one another, that matrix-like divides the imaginary computer raster image sub-areas into imaginary raster point positions, a logic device that matrix-like divides the imaginary computer raster image sub-areas into n imaginary raster point positions, and that matrix-like divides the sub-areas of the record carrier raster image into n imaginary picture element positions. The picture element positions are assigned to the raster image positions. A plotting device is included that simultaneously plots the picture elements corresponding to the raster points of a sub-area of a record carrier raster image and that successively plots the sub-areas of the record carrier raster image. The light modulator is continuously movable relative to the record carrier to capture an entire surface of the record carrier according to the sub-areas of the record carrier raster image. A device that projects the light modulator for each sub-area of the record carrier raster image with light is provided, as is a displaceable lens disposed between the light modulator and the record carrier. During relative displacement between the light modulator and the record carrier, an excursion of the light beams emanating from the light modulator and impacting a sub-area of the record carrier raster image during a time interval T are compensated with the displaceable lens. The time interval T is above a value W1, which relates to a maximum permissible displacement path for the relative movement for plotting resolution without use of the displacable lens, is below a value W2, which relates to a time interval that begins when a first half of the light modulator surface projects into a specified sub-area of the record carrier raster image and that ends when only a second half of the light modulator surface projects into the specified sub-area of the record carrier raster image, and is reduced by a reverse period for the displacable lens. A lens displacing device is provided that moves the displaceable lens, after recording the picture elements in a record carrier raster image sub-area, in a direction opposite to the compensation direction into a starting position for plotting of the next sub-area of the record carrier raster image.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The computer-stored raster image is divided into imaginary matrix-like computer raster image sub-areas, with each sub-area exhibiting matrix-like arranged raster point positions.

Each raster point position is to be understood as a storage cell having binary status (information content): 'on' or 'off'.

The computer-stored raster image can be understood as being composed of raster points having an 'on' or 'off' status.

The raster pitch, the imaginary distance between two adjacent raster points is predetermined.

The raster image can be used for reproducing structures, such as the route of printed conductors on printed circuit boards.

Printed conductors of this type are designed with the aid of a computer program and stored in a computer as a raster image which is then plotted on a photosensitive record carrier under computer program control.

The plotted raster image (raster image of the record carrier) is composed of the smallest 'picture points'.

The raster image of the record carrier is divided into imaginary matrix-like computer raster image sub-areas, with each sub-area exhibiting matrix-like arranged picture point positions.

Both the computer raster image sub-areas and the raster image sub-areas of the record carrier, as well as the raster point positions and the picture element positions are associated with one another.

The picture elements which correspond to the raster point positions of the corresponding computer raster image sub-area are plotted simultaneously for each sub-area of the raster image of the record carrier.

Overall plotting comprises successive plotting of all sub-areas of the raster image record carriers.

In the case of the LCD matrix mentioned at the outset, for instance of the type LDK 036 T-20 AM LCD 2.8 inches marketed by Flat Panel Display Company, Eindhoven, Holland, each light-modulation element of this LCD matrix can be selectively controlled by electrical means (corresponding to the binary status of the raster point position of the sub-area of the computer raster image assigned to the LCD matrix) such that it is transparent or opaque to transmitted light.

Refined controls permit variation of the degree of transparency to (transmitted) light.

Commercially available liquid crystal matrices comprise a number of 640×480 to 1024×768 light-modulation elements which can be used for light in the wavelength range from 380 to 700 nm (nanometer). They are available in diagonal dimensions from 2.8 inches to 5.8 inches. (1 inch=2.54 cm).

The LCD matrices operating by transmitted light may also be replaced by other devices, for example by so-called digital light-processing devices or digital mirror devices marketed by Texas Instruments, where electrostatically controllable tilting mirror elements, arranged matrix-like on the basis of semiconductor technology, can be placed in two different tilt attitudes (±10°).

Arrangements of this type function by means of reflection, with the mirror element reflecting the light in two different directions. Plotting of a picture element in a sub-area of the record carrier raster image is possible for each mirror.

Commercially available tilting mirror semiconductor chips having a surface area of 13.6 mm square and distances of 17 micrometers between the tilting mirror elements have an extremely high density of tilting mirror elements (800× 600 elements).

Instead of the LCD matrix or the semiconductor chips of the tilting mirror elements other known arrangements-generally designated as light modulators can be utilized, for example those which operate according to magneto-optical or ferro-electrical principles.

Figure 1:
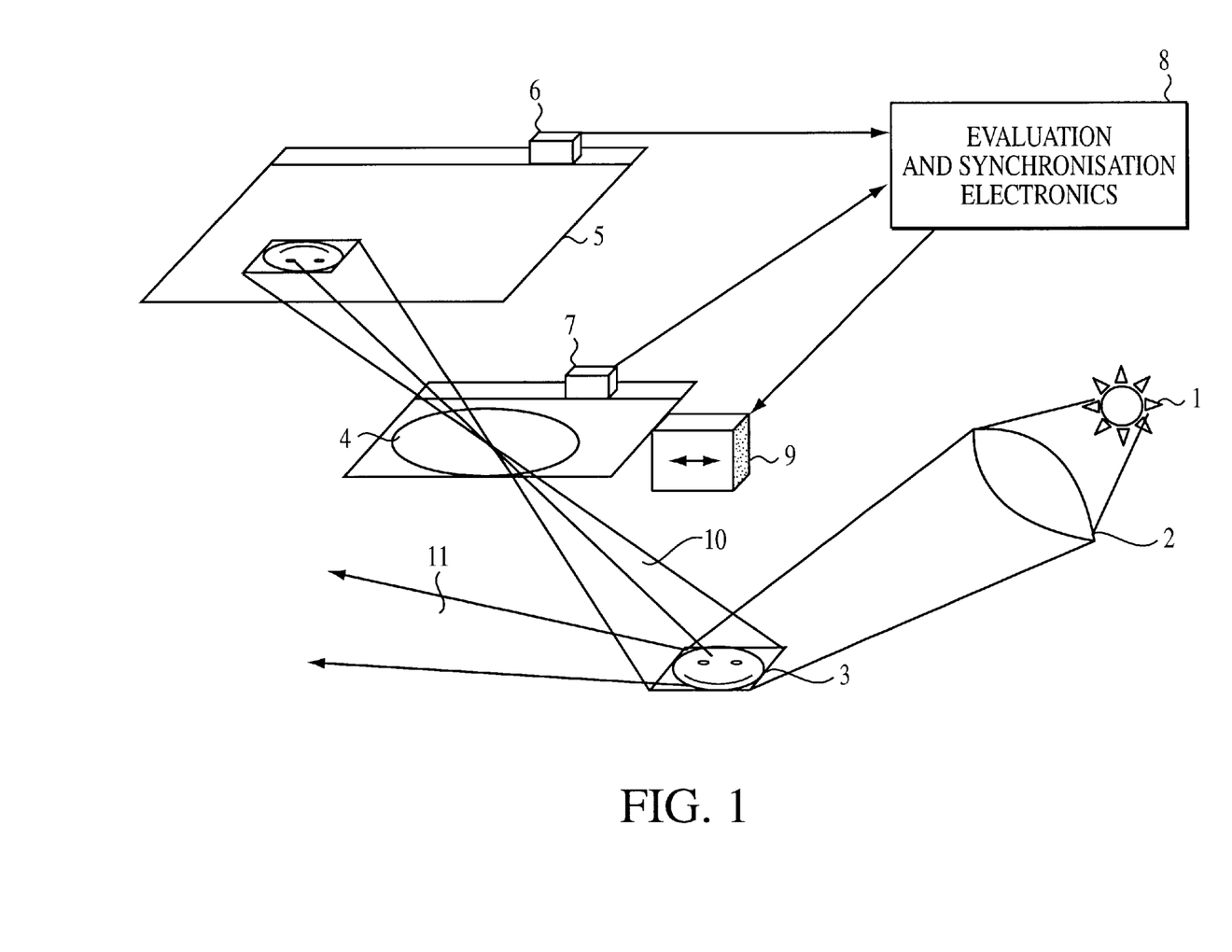
FIG. 1 schematically illustrates process according to the present invention.

FIG. 1 is a schematic view of the process according to the present invention. The light of a light source 1 (with a large-surface area), such as a high-pressure mercury lamp, is guided by way of a condenser lens 2 as incident light to the a tilting mirror elements of a semiconductor chip which is connected by means of a connection, (not illustrated here) to the computer in which the computer raster image is stored. Chip 3 receives the information required for plotting a sub-area of the record carrier raster image from the sub-area of the computer raster image associated therewith. The chip is part of the exposure head which also includes the light source. The exposure head and record carrier 5 are continuously moved relative to one another. Record carrier 5 is divided into imaginary sub-areas of the record carrier raster image arranged matrix-like.

FIG. 1 shows how the sub-area is plotted with the 'visual representation'.

The light bundle utilized for plotting is designated with reference numeral 10. It passes through focussing lens 4 which during exposure is moved opposite the direction of movement of the exposure head or record carrier 5 parallel to the record carrier. This effectively prevents the plotting of a picture element (point) degenerating into plotting of a dash (point with 'comet trail') during sustained exposure when chip 3 is moved or when the record carrier is moved. The excursion of a light beam (determined by the relative movement between chip and record carrier) is compensated for by the correspondingly synchronized counter-movement of the focussing lens. In this way a much more energy-rich plotting (5000 times and greater) can be generated with 'sustained light' than is possible during flash function according to the prior art.

In accordance with the laws of geometrical optics imaging occurs always through the center of the optical system.

Following a relative movement (between chip and record carrier), corresponding to approximately half of the sub-area of the record carrier raster image, the chip (light modulator) is switched to the dark state and the focussing lens is retracted to a relative starting position for the subsequent new sub-area of the record carrier raster image. As the new sub-area is reached, the chip is activated with new information and the focussing lens is again displaced to work in the opposite direction. A detailed illustration with respect thereto is given in conjunction with FIG. 3.

After plotting of the sub-area of the record carrier raster image of a whole row, plotting of the next row follows in the opposite line direction, until the entire record carrier surface is acquired. Thus, the plotting of each sub-area is associated with a respective and opposite compensating movement of the focussing lens. For each new sub-area the focussing lens must be retracted to its relative starting position for the new sub-area. Due to minimal weight of the lens (several grams) such resetting is easy to perform, for instance, by means of piezoelectric crystal movement control ('Nanomotor' marketed by Nanomotion Inc., Israel).

In the case of plotting a sub-area of a record carrier raster image its position (insofar as the record carrier is moved relative to the tilting mirror element semiconductor chip) is captured thereon by a position transducer 6 (for example, a commercially available linear encoder device) and transmitted to the evaluation and synchronization electronics 8. This unit 8 also receives signals from a position transducer 7 which serves to report the position of focussing lens 4. These data are required to control the precision displacement 9 of the focussing lens.

If none of the mirrors of chip 3 is activated, the incident light is reflected in direction 11 and can reach neither focussing lens 4 nor record carrier 5. Only an activated mirror reflects light through the focussing lens for plotting of a picture element. The driver circuit for chip 3 is known and is available commercially, as such chips are used as picture-generating elements by video projectors which can be connected directly to a computer graphics card, for example, NEC data projector Multisync LT 80 marketed by NEC.

The process according to the present invention demands precise synchronization of the relative movement between record carrier 5 and focussing lens 4 (in case 1 fixed chip), or the relative movement between chip and focussing lens 4 with stationary record carrier 5, as in case 2 (not illustrated here). Synchronization is controlled by means of control electronics 8 based on the signals of position transducers 6 and 7 in case 1.

In case 2 the focussing lens and displaced chip respectively would each have to be equipped with a position transducer.

The control electronic takes into account the necessarily different sweep speeds of the movements relative to one another. It conveys necessary correction movements and speeds to ensure stable imaging of the light-modulation system on to the record carrier. In order to reach a satisfactory solution, high-resolution positioning systems with resolutions of 100 nanometers can be used. In the case of nanomotors operating at a clock rate of 40 kilohertz there is a correction opportunity for the speed of the relative displacement after 4 micrometers of head movement (dependent on the imaging scale).

Figure 2A:
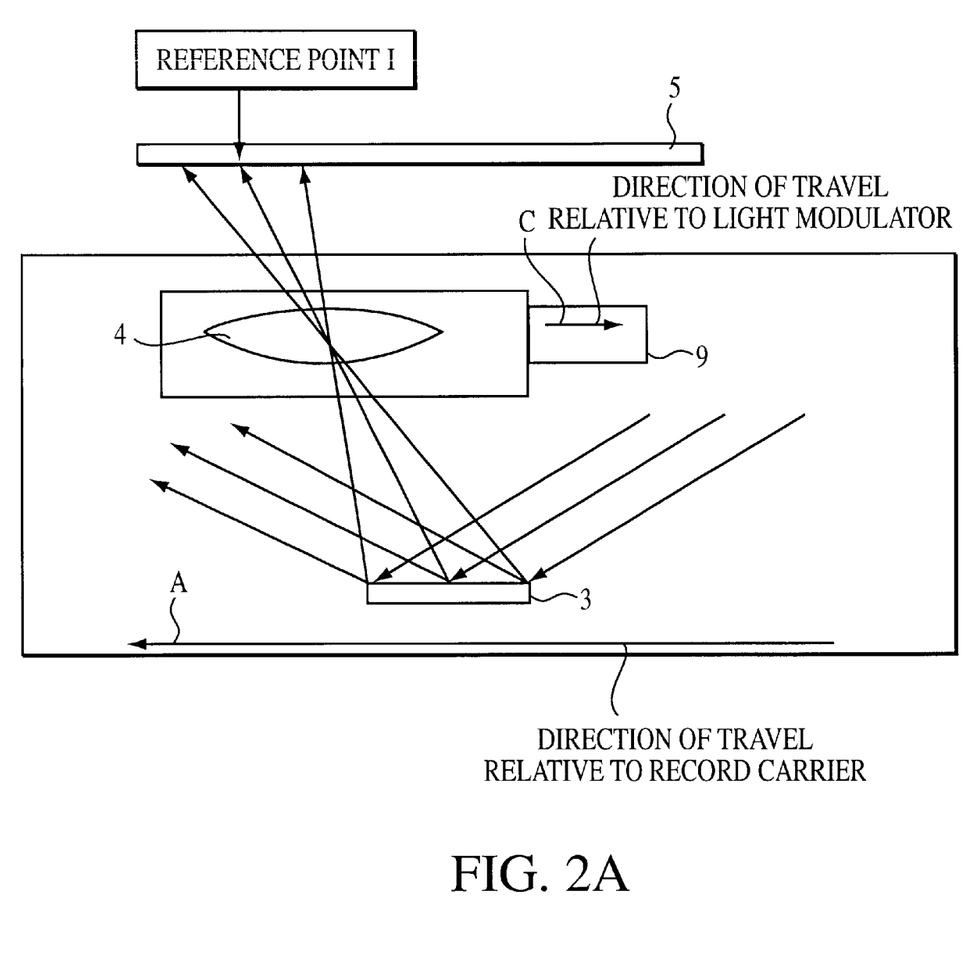
FIGS. 2a, 2b, and 2c schematically illustrate the process according to the present invention at different time intervals.
Figure 2B:
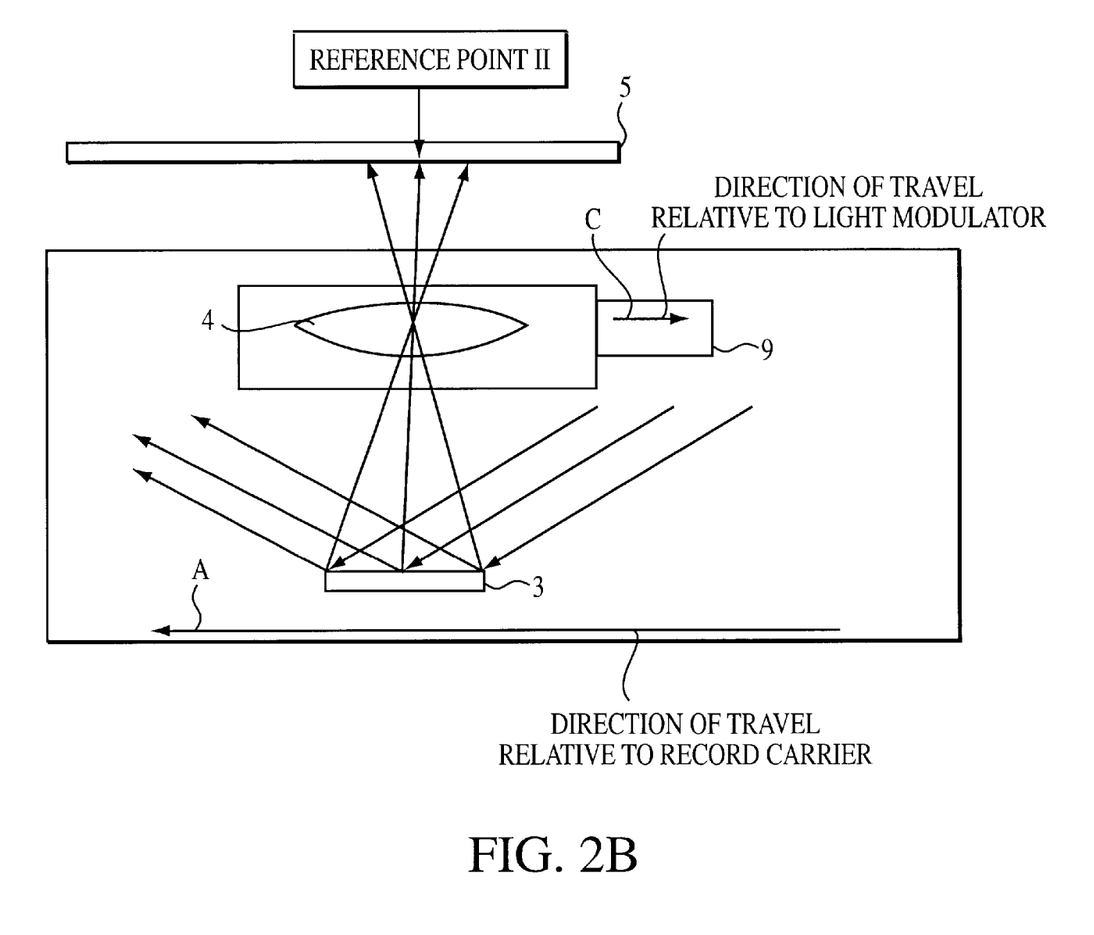
Figure 2C:
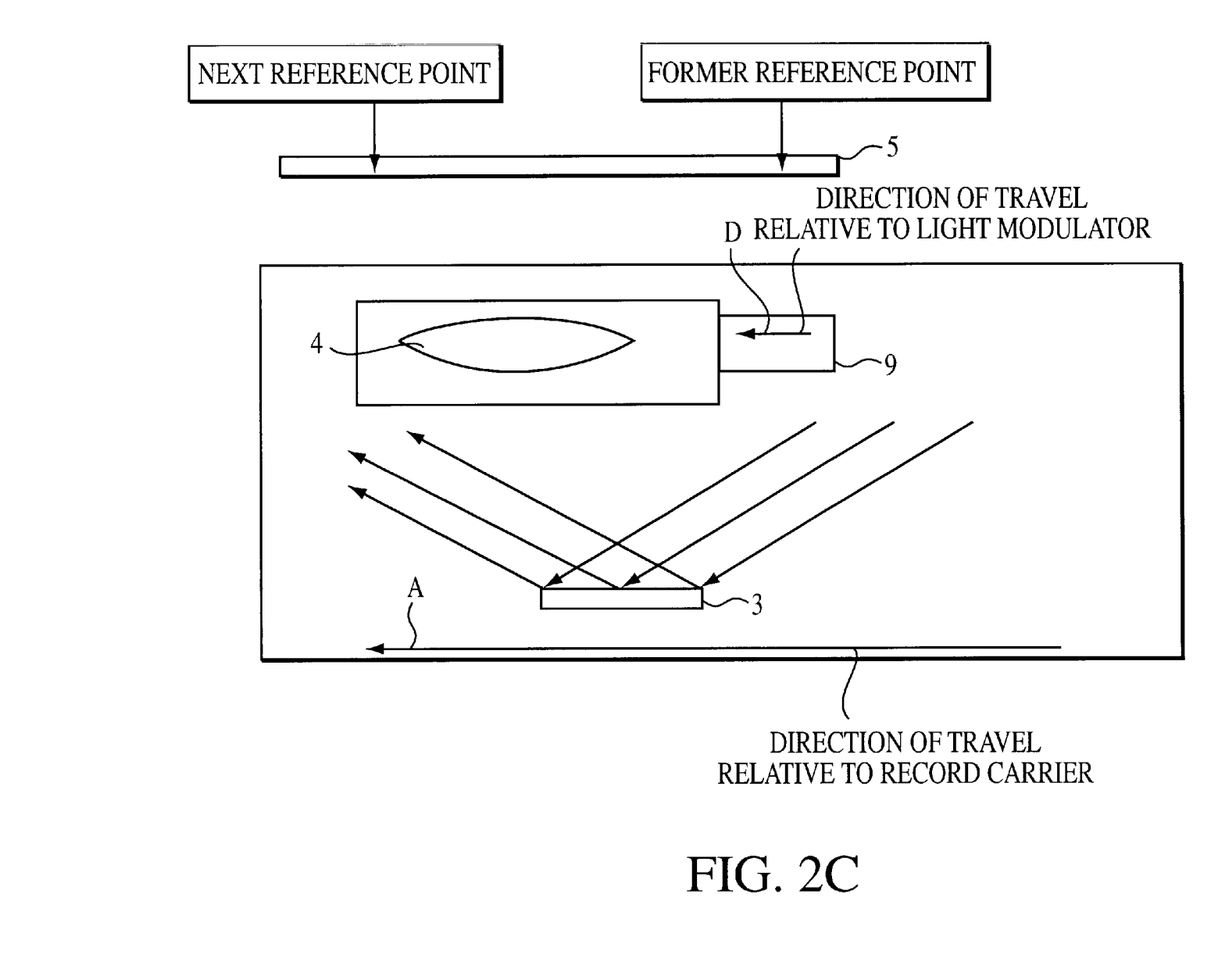

FIGS. 2a, 2b and 2c each schematically depict plotting at various time intervals:

FIG. 2a relates to plotting with respect to reference point 1, while FIG. 2b relates to plotting with respect to a reference point 11 of the same sub-area of the record carrier raster image.

FIG. 2c relates to resetting of the focussing lens for plotting of the subsequent sub-area of the record carrier raster image.

In the illustrations in FIGS. 2a, 2b and 2c record carrier 5 is moved continuously relative to the chip in the direction of the heavy unbroken arrow A. Focussing lens 4 is displaced by displacement element 9 during plotting of a sub-area of the record carrier raster image opposite to direction of movement A in direction C, as in FIGS. 2a and 2b. Following plotting of a sub-area of the record carrier raster image the focussing lens retracts in direction D (same direction as direction A) through displacement element 9 into a starting position relative to the subsequent sub-area of the record carrier raster image to be plotted (FIG. 2c).

FIG. 2a relates to plotting relative to reference point 1, whereas FIG. 2b relates to plotting, with respect to reference point 11, of the same sub-area of the record carrier raster image. During this time interval the focussing lens is displaced in the opposite direction (direction C) to direction A, which gives the relative displacement between the tilting mirror elements of the semiconductor chip and the record carrier. Following successful plotting of this sub-area of the record carrier raster image preparations are made for plotting of the subsequent sub-area of the record carrier raster image by the focussing lens being retracted in direction D (parallel to direction A), according to FIG. 2c, for the new sub-area of the record carrier raster image to reach a relative starting position, from where it can be displaced again in the opposite direction to direction A.

If the displacement speed of the focussing lens during the plotting phase of a sub-area of the record carrier raster image is synchronized with the movement of record carrier 5 such that imaging of the data pattern appears stationary to record carrier 5, there is no blurring of the image on account of the movement of the record carrier.

If, for example, the focussing lens reduces the imaging scale of the plotting to half, and if the distance of the 'deformable' tilting mirror elements amounts to 0.017 mm, in an embodiment of the invention the light modulator should be switched off every time at the latest when the record carrier is moved by half of 800×0.017 mm (with 800 tilting mirror elements in one row of the light modulator). This is accomplished by the impulses from the position transducer 7 being used to control the positioning of focussing lens 4 from sub-area of the record carrier raster image to sub-area of the record carrier raster image. Following respective resetting of the focussing lens in a starting position for a new sub-area of the record carrier raster image the light modulator is reactivated. The control electronics 8 then controls the displacement of the focussing lens during plotting in a sub-area of the record carrier raster image.

It is pointed out that there is also the possibility of using a mobile mirror for scanning the record carrier, instead of a record carrier shifted relative to the light modulator. In this case, position transducer 6 is attached to the mobile mirror, instead of to the record carrier.

It is noted that the present invention is not limited to the use of tilting mirror element semiconductor chips as light modulators. Therefore, other light modulators such as two-dimensional liquid crystal arrangements, two-dimensional magneto-optical or ferro-electrical or other such light modulators can be used, by way of example.

Known light-sensitive, liquid recording material can also be utilized which hardens at exposed points. In this way quasi-three-dimensional forms can be achieved.

It is also pointed out that the present invention is not limited to plane record carriers. It is also possible to use a record carrier applied to a rotary drum and to rotate the drum in front of the focussing lens.

Figure 3:
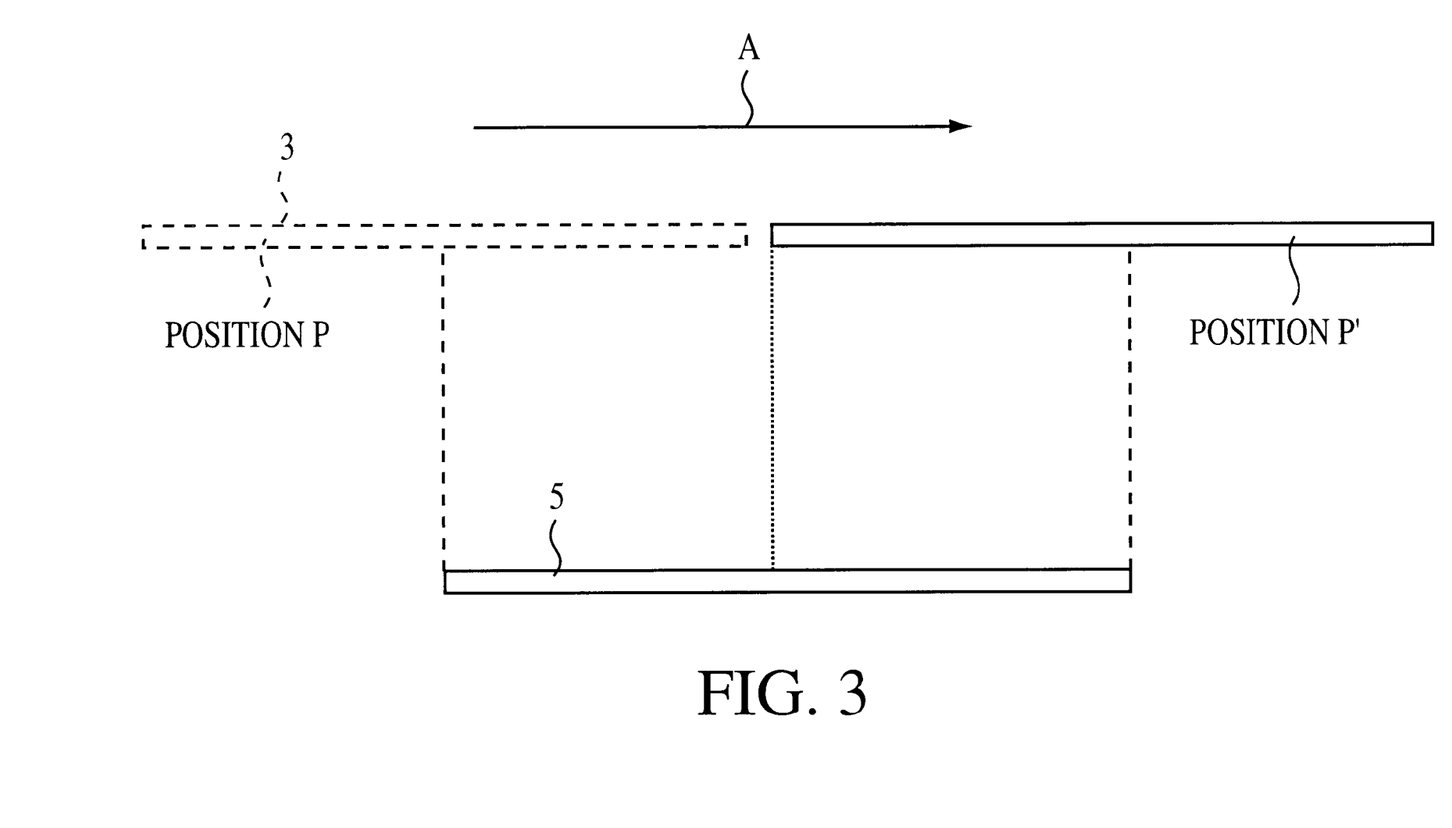
FIG. 3 illustrates a maximum exposure period of plotting a raster image sub-area of a record carrier.

FIG. 3 is a principal representation for the exposure time interval for plotting the picture elements of a sub-area of the record carrier raster image. Record carrier and light modulator 3 are displaced relative to one another in arrow direction A. In the dashed position P light modulator 3 is moved with just the first half of its surface over the sub-area of the record carrier raster image. From this moment on sustained exposure can take place until such time as the light modulator has moved so far (unbroken position P') that only its second half lies over the sub-area of the record carrier raster image. During this period the imaging is compensated by corresponding displacement of the lens (not illustrated here), so that there is no blurred plotting. This maximum time period of sustained exposure is reduced by the time required for retracting the lens prior to plotting of the next sub-area of the record carrier raster image.

Focussing lens 4 also determines the imaging scale of the plotting, apart from its function enabling sustained exposure.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for plotting of a raster image on a light-sensitive record carrier comprising:

converting a computer-stored raster image comprising raster points into controllable raster point-related light beams via a light modulator, such that picture elements corresponding to the raster points are plotted on the record carrier;

matrix-like dividing of the computer raster image into imaginary computer raster image sub-areas;

matrix-like dividing of the record carrier raster image into imaginary record carrier raster image sub-areas, wherein the sub-areas of the computer and record carrier raster image are associated with one another;

matrix-like dividing of the imaginary computer raster image sub-areas into n imaginary raster point positions, wherein n is an integer number;

matrix-like dividing of the sub-areas of the record carrier raster image into n imaginary picture element positions, wherein n is an integer number;

assigning the picture element positions to the raster image positions;

simultaneously plotting the picture elements corresponding to the raster points of a sub-area of a record carrier raster image;

successively plotting the sub-areas of the record carrier raster image;

continuously moving a light modulator relative to the record carrier to capture an entire surface of the record carrier according to the sub-areas of the record carrier raster image;

projecting the light modulator for each sub-area of the record carrier raster image with light;

during relative displacement between the light modulator and the record carrier, compensating an excursion of the light beams emanating from the light modulator and impacting a sub-area of the record carrier raster image during a time interval T with a displaceable lens disposed between the light modulator and the record carrier, wherein the time interval T is above a value W1, which relates to a maximum permissible displacement path for the relative movement for plotting resolution without use of the displacable lens, is below a value W2, which relates to a time interval that begins when a first half of the light modulator surface projects into a specified sub-area of the record carrier raster image and that ends when only a second half of the light modulator surface projects into the specified sub-area of the record carrier raster image, and is reduced by a reverse period for the displacable lens; and displacing the displaceable lens, after recording the picture elements in a record carrier raster image sub-area, in a direction opposite to the compensation direction into a starting position for plotting of the next sub-area of the record carrier raster image.

2. The process in accordance with claim 1, wherein the light modulator comprises a tilting mirror element semiconductor chip.

3. The process in accordance with claim 1, wherein the light modulator comprises a liquid crystal arrangement.

4. The process in accordance with claim 1, wherein the light modulator comprises one of a magneto-optical and ferro-optical electrical arrangement.

5. The process in accordance with claim 1, wherein a light source is adapted to emit sustained light.

6. The process in accordance with claim 5, wherein the light source comprises a mercury arc lamp.

7. The process in accordance with claim 1, wherein the record carrier comprises a material in a liquid state prior to plotting.

8. The process in accordance with claim 1, wherein the displacable lens comprises a multiple element lens that determines a focussing scale.

9. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier; and
- continuously displacing the lens relative to the exposure head and light-sensitive record carrier; and
- directing a sustained light beam onto the exposure head.

10. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier;
- continuously displacing the lens relative to the exposure head and light-sensitive record carrier; and
- directing a sustained light beam from a mercury arc lamp onto the exposure head.

11. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier; and
- continuously displacing the lens relative to the exposure head and light-sensitive record carrier,
- wherein the displacing of the lens relative to the exposure head and the light-sensitive record carrier compensates for blurring.

12. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier;
- continuously displacing the lens relative to the exposure head and light-sensitive record carrier; and
- logically subdividing the light-sensitive record carrier into a matrix-like arrangement, wherein each entry of the matrix-like arrangement corresponds to a portion of the raster image to be plotted.

13. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier;
- continuously displacing the lens relative to the exposure head and light-sensitive record carrier;
- during plotting, adjusting the exposure head so that light, through the lens, is incident upon the light-sensitive record carrier;
- after plotting, adjusting the exposure head so that light is not incident upon the light-sensitive carrier; and
- returning the lens to a starting position.

14. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier; and
- continuously displacing the lens relative to the exposure head and light-sensitive record carrier,
- wherein a drive unit is coupled to the exposure head and the light-sensitive record carrier is fixedly positioned.

15. A process for a plotting raster image on a light-sensitive record carrier comprising:
- continuously displacing an exposure head, comprising a light modulator, relative to the light-sensitive record carrier;
- positioning a lens between the exposure head and the light-sensitive record carrier; and
- continuously displacing the lens relative to the exposure head and light-sensitive record carrier,
- wherein, during plotting, the lens is displaced in a direction opposite a direction of the relative movement of the exposure head; and
- wherein, after plotting, the lens is displaced in a same direction as the direction of relative movement of the exposure head.

16. An apparatus for plotting a raster image comprising:
- an exposure head comprising a light modulator;
- a light-sensitive record carrier;
- a plotting drive unit coupled to at least one of the exposure head and the light-sensitive record carrier, whereby the exposure head and the light-sensitive record carrier are adapted for relative movement to each other;
- a lens positioned between the exposure head and the light-sensitive record carrier;
- a lens drive unit coupled to the lens, whereby the lens is adapted for movement relative to the exposure head and light-sensitive record carrier; and
- a light source adapted to emitting a sustained light beam.

17. The apparatus in accordance with claim 16, wherein the light source comprises a mercury arc lamp.

18. An apparatus for plotting a raster image comprising:
- an exposure head comprising a light modulator;
- a light-sensitive record carrier;
- a plotting drive unit coupled to at least one of the exposure head and the light-sensitive record carrier, whereby the exposure head and the light-sensitive record carrier are adapted for relative movement to each other;
- a lens positioned between the exposure head and the light-sensitive record carrier; and
- a lens drive unit coupled to the lens, whereby the lens is adapted for movement relative to the exposure head and light-sensitive record carrier,
- wherein the light modulator comprises a tilting mirror element semiconductor chip.

19. An apparatus for plotting a raster image comprising:
- an exposure head comprising a light modulator;
- a light-sensitive record carrier;
- a plotting drive unit coupled to at least one of the exposure head and the light-sensitive record carrier, whereby the exposure head and the light-sensitive record carrier are adapted for relative movement to each other;

a lens positioned between the exposure head and the light-sensitive record carrier; and a lens drive unit coupled to the lens, whereby the lens is adapted for movement relative to the exposure head and light-sensitive record carrier, wherein the light modulator comprises a liquid crystal arrangement.

20. An apparatus for plotting a raster image comprising:

an exposure head comprising a light modulator;

a light-sensitive record carrier;

a plotting drive unit coupled to at least one of the exposure head and the light-sensitive record carrier, whereby the exposure head and the light-sensitive record carrier are adapted for relative movement to each other;

a lens positioned between the exposure head and the light-sensitive record carrier; and a lens drive unit coupled to the lens, whereby the lens is adapted for movement relative to the exposure head and light-sensitive record carrier, wherein the light modulator comprises one of a magneto-optical and ferro-optical electrical arrangement.

21. An apparatus for plotting of a raster image on a light-sensitive record carrier comprising:

a light modulator adapted to convert a computer-stored raster image comprising raster points into controllable raster point-related light beams, wherein picture elements corresponding to the raster points are plotable on the record carrier;

a logic device that matrix-like divides the computer raster image into imaginary computer raster image sub-areas, that matrix-like divides the record carrier raster image into imaginary record carrier raster image sub-areas, wherein the sub-areas of the computer and record carrier raster image are associated with one another, that matrix-like divides the imaginary computer raster image sub-areas into n imaginary raster point positions, and that matrix-like divides the sub-areas of the record carrier raster image into n imaginary picture element positions, wherein n is an integer number, wherein the picture element positions are assigned to the raster image positions;

a plotting device that simultaneously plots the picture elements corresponding to the raster points of a sub-area of a record carrier raster image and that successively plots the sub-areas of the record carrier raster image;

the light modulator being continuously movable relative to the record carrier to capture an entire surface of the record carrier according to the sub-areas of the record carrier raster image;

a device that projects the light modulator for each sub-area of the record carrier raster image with light, a displaceable lens disposed between the light modulator and the record carrier, wherein, during relative displacement between the light modulator and the record carrier, an excursion of the light beams emanating from the light modulator and impacting a sub-area of the record carrier raster image during a time interval T are compensated with the displaceable lens, wherein the time interval T is above a value WI, which relates to a maximum permissible displacement path for the relative movement for plotting resolution without use of the displacable lens, is below a value W1, which relates to a time interval that begins when a first half of the light modulator surface projects into a specified sub-area of the record carrier raster image and that ends when only a second half of the light modulator surface projects into the specified sub-area of the record carrier raster image, and is reduced by a reverse period for the displacable lens; and a lens displacing device that moves the displaceable lens, after recording the picture elements in a record carrier raster image sub-area, in a direction opposite to the compensation direction into a starting position for plotting of the next sub-area of the record carrier raster image.

22. The apparatus in accordance with claim 21, wherein the light modulator comprises a tiltable mirror element semiconductor chip.

23. The apparatus in accordance with claim 21, wherein the light modulator comprises a liquid crystal arrangement.

24. The apparatus in accordance with claim 21, wherein the light modulator comprises one of a magneto-optical and ferro-optical electrical arrangement.

25. The apparatus in accordance with claim 21, wherein a light source is adapted to emit sustained light.

26. The apparatus in accordance with claim 25, wherein the light source comprises a mercury arc lamp.

27. The apparatus in accordance with claim 21, wherein the record carrier comprises a material in a liquid state prior to plotting.

28. The apparatus in accordance with claim 21, wherein the displacable lens comprises a multiple element lens that determines a focussing scale.

* * * * *